(12) United States Patent
Xu et al.

(10) Patent No.: US 10,943,614 B1
(45) Date of Patent: Mar. 9, 2021

(54) LOAD/UNLOAD RAMP MECHANISM FOR REDUCED CRACKING

(71) Applicant: Western Digital Technologies, Inc., San Jose, CA (US)

(72) Inventors: Jianqian Xu, Kawasaki (JP); Hiroki Kitahori, Fujisawa (JP); Shin Nagahiro, Fujisawa (JP); Nobuyuki Okunaga, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/794,079

(22) Filed: Feb. 18, 2020

(51) Int. Cl.
| | | |
|---|---|---|
| *G11B 5/54* | (2006.01) | |
| *G11B 5/60* | (2006.01) | |
| *G11B 19/20* | (2006.01) | |
| *G11B 33/04* | (2006.01) | |
| *G11B 21/22* | (2006.01) | |
| *G11B 5/55* | (2006.01) | |

(52) U.S. Cl.
CPC .............. *G11B 5/6011* (2013.01); *G11B 5/54* (2013.01); *G11B 5/5582* (2013.01); *G11B 19/209* (2013.01); *G11B 21/22* (2013.01); *G11B 33/0472* (2013.01)

(58) Field of Classification Search
None
See application file for complete search history.

(56) References Cited

U.S. PATENT DOCUMENTS

| | | | |
|---|---|---|---|
| 6,160,686 A | 12/2000 | Albrecht et al. | |
| 6,424,501 B1* | 7/2002 | Tsujino | G11B 5/54 360/254.7 |
| 6,487,051 B1 | 11/2002 | Koyanagi et al. | |
| 6,690,548 B2* | 2/2004 | Koyanagi | G11B 5/54 360/254.8 |
| 6,903,902 B1 | 6/2005 | Hiller | |
| 6,987,640 B2* | 1/2006 | Tsang | G11B 5/54 360/254.7 |
| 7,672,083 B1* | 3/2010 | Yu | G11B 5/54 360/254.4 |
| 8,730,620 B1* | 5/2014 | Nakamiya | G11B 21/22 360/254.7 |
| 9,183,862 B1 | 11/2015 | Shah et al. | |

(Continued)

FOREIGN PATENT DOCUMENTS

JP     2007073168 A     3/2007

OTHER PUBLICATIONS

Israel Patent Office (ISA/IL), PCT International Search Report and Written Opinion for counterpart International application No. PCT/US2020/036518, dated Sep. 6, 2020, 13 pages.

*Primary Examiner* — Jefferson A Evans
(74) *Attorney, Agent, or Firm* — John D. Henkhaus

(57) ABSTRACT

A load/unload ramp assembly for a hard disk drive includes a support plate having at least one interlock slot and a plurality of ramp units interconnected with the support plate. At least one of the ramp units includes an interlock structure that protrudes into a corresponding interlock slot of the support plate, and is configured to move within the interlock slot in response to shrinkage of the ramp unit upon cooling associated with manufacturing of the ramp assembly. The ends of the interlock slot may be configured to manage the shrinkage and/or to maintain design dimensions.

19 Claims, 5 Drawing Sheets

(56) References Cited

U.S. PATENT DOCUMENTS

| | | | |
|---|---|---|---|
| 2004/0240112 A1* | 12/2004 | Lee .......................... | G11B 5/54 |
| | | | 360/137 |
| 2005/0286171 A1* | 12/2005 | Kim .......................... | G11B 5/54 |
| | | | 360/254.7 |
| 2010/0226231 A1 | 9/2010 | Kanayama et al. | |

* cited by examiner

LOAD/UNLOAD RAMP MECHANISM FOR REDUCED CRACKING

FIELD OF EMBODIMENTS

Embodiments of the invention may relate generally to rotating-disk data storage devices and more particularly to a load/unload ramp configured for crack reduction.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Ramp load/unload (LUL) technology involves a mechanism that moves the head stack assembly (HSA), including the read-write head sliders, away from and off the disks and safely positions them onto a cam-like structure. One approach to a LUL ramp design may involve a thermoplastic material molded around a metal plate, whereby the thermoplastic material shrinks when cooling down from the molding process, considerably more than the metal plate shrinks. Thus, this type of ramp may have large internal stresses after manufacture. Furthermore, the trend toward larger disk stacks results in a higher/larger ramp design that can also lead to larger internal stresses than with shorter/smaller ramps. Such internal stresses are considered a main reason that these types of ramps may eventually crack during the product lifecycle.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a load/unload ramp for a hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a spinning-disk digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
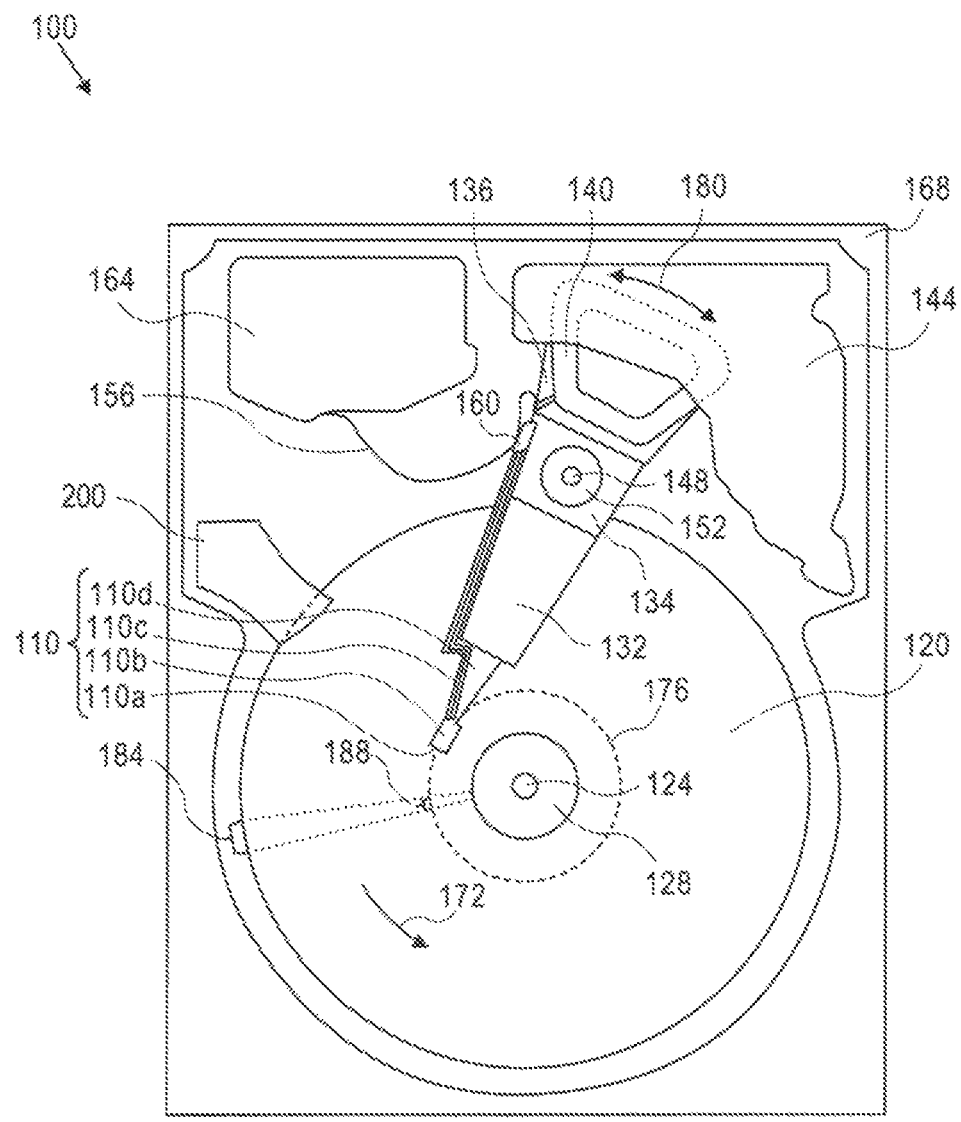
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

Figure 2:
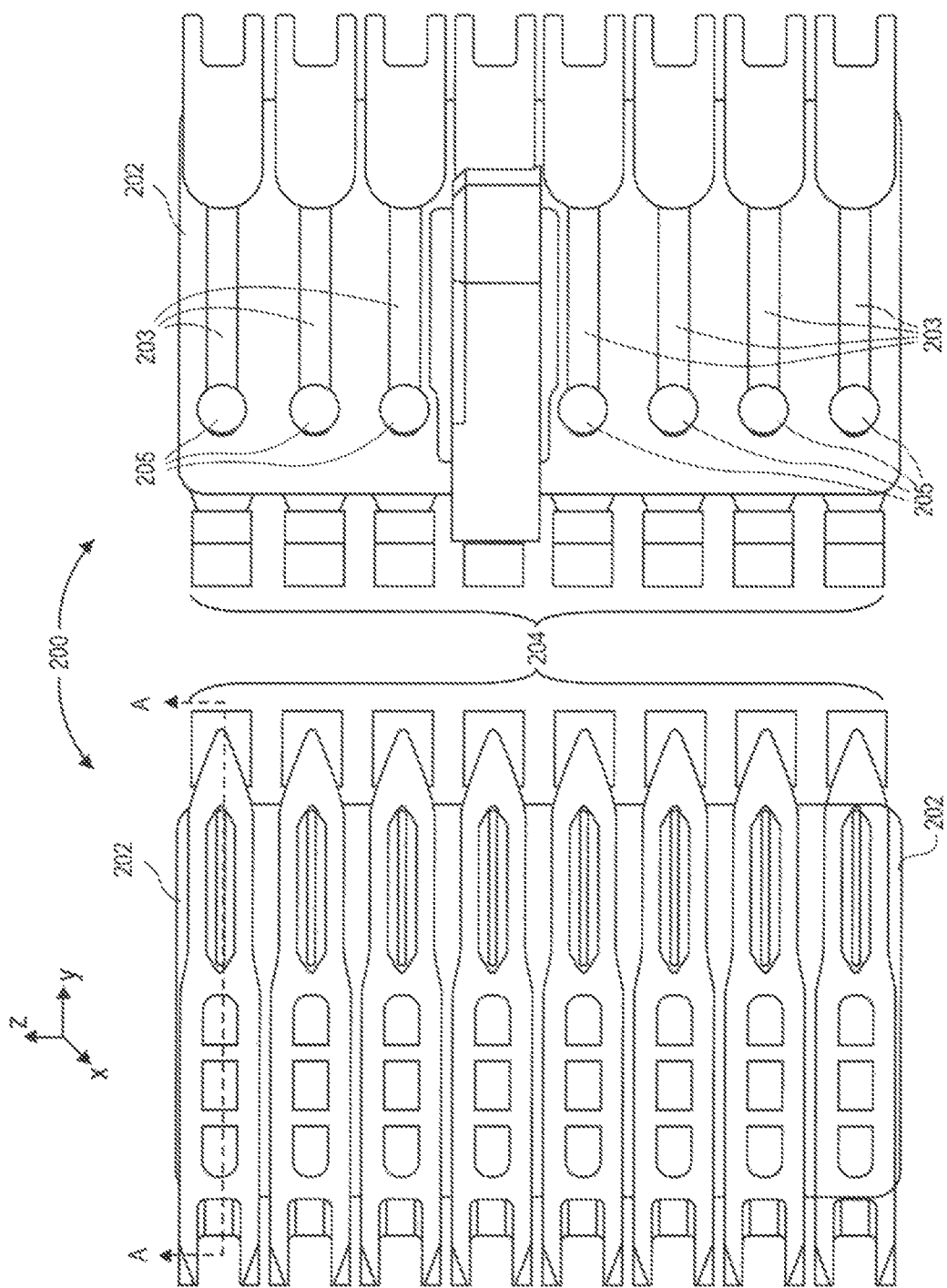
FIG. 2A is a front view illustrating a load/unload ramp assembly, according to an embodiment.
FIG. 2B is a back view illustrating the load/unload ramp assembly of FIG. 2A, according to an embodiment.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations. The HGA is configured to mechanically interact with a load/unload (LUL) ramp (according to an embodiment, see ramp 200 of FIGS. 2A, 2B) to move the head stack assembly (HSA), including the read-write head sliders, away from and off the disks and to safely position them onto the supporting structure of the LUL ramp.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily exactly and precisely as stated. For example, describing a structure as "substantially vertical" would assign that term its plain meaning, such that the feature is vertical for all practical purposes but may not be precisely at 90 degrees from horizontal.

While terms such as "optimal", "optimize", "minimal", "minimize", "maximal", "maximize", and the like, may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that ramp load/unload (LUL) technology involves a mechanism that moves the head stack assembly (HSA), including the read-write head sliders, away from and off the disks and safely positions them onto a cam-like structure. The cam typically includes a shallow ramp on the side closest to the disk. During a power-on sequence, for example, the read-write heads are loaded by moving the sliders off the ramp and over the disk surfaces when the disks reach the appropriate rotational speed. Thus, the terminology used is that the sliders or HSA are/is "loaded" to or over the disk (i.e., off the ramp) into an operational position, and "unloaded" from the disk (i.e., onto the ramp) such as in an idle position.

Recall also that one approach to a LUL ramp design may involve a thermoplastic material molded around a metal plate, whereby the thermoplastic material shrinks when cooling down from the molding process. This inherent phase of the manufacturing process can introduce non-trivial internal stresses into the ramp component, which likewise may eventually lead to component cracking. Attention has been given to reducing the likelihood of LUL ramp cracking, such as by removing an internal limiter feature, experimenting with different thermoplastic materials (e.g., with larger tensile strength and elastic modulus), and various other design changes, none of which have been found to completely eliminate large stresses (e.g., especially in the vertical or z-direction of the ramp) and consequent ramp cracking. With that in mind, a ramp design that can reduce the internal stresses and inhibit or prevent ramp cracks is considered desirable.

Hard Disk Drive Load/Unload Ramp Assembly

Figure 3:
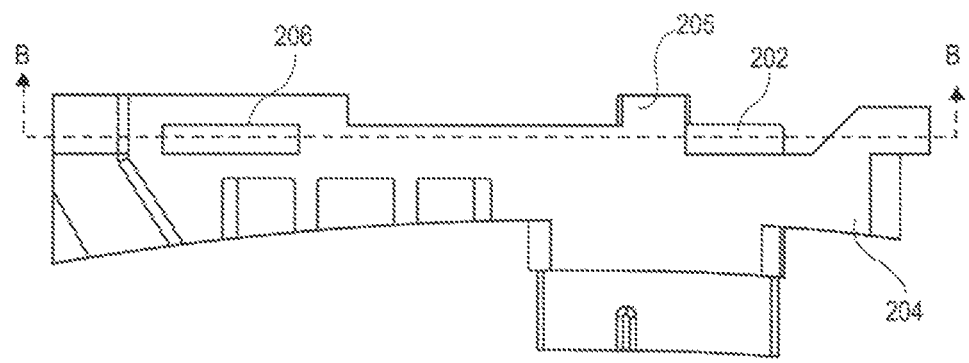
FIG. 3 is a cross-sectional top view illustrating a ramp unit of the load/unload ramp assembly of FIG. 2A, according to an embodiment.

FIG. 2A is a front view illustrating a load/unload ramp assembly, and FIG. 2B is a back view illustrating the load/unload ramp assembly of FIG. 2A, according to an embodiment. FIG. 3 is a cross-sectional top view illustrating a ramp unit of the load/unload ramp assembly of FIG. 2A, according to an embodiment.

Load/unload ramp assembly 200 (simply, "ramp assembly 200") comprises a support (or "reinforcing") plate 202 and a plurality of ramp units 204 (or "ramp bodies") (eight depicted in FIGS. 2A, 2B) interconnected with the support plate 202. According to an embodiment, the support plate 202 is composed of steel (e.g., stainless steel) and the ramp units 204 are composed of polyoxymethylene (POM). According to an embodiment, the plurality of ramp units 204 is insert-molded with the support plate 202, a well-known manufacturing process. Note that each ramp unit 204 comprises what is referred to herein as a load/unload end ("LUL end"), i.e., the left-hand side of FIG. 2A and the right-hand side of FIG. 2B, and a "gate end", i.e., the right-hand side of FIG. 2A and the left-hand side of FIG. 2B. The "gate end" refers to the side from which the POM or other molding material flows in the molding process, i.e., from the mold gate into the mold die.

The support plate 202 may be composed of a material having a first coefficient of thermal expansion and the ramp units 204 composed of a material having a second coefficient of thermal expansion greater than the first coefficient of thermal expansion. Hence, incompatibility or inconsistency in the context of respective rates and degrees of shrinkage associated with each sub-component during a cool-down phase of a manufacturing process is of interest. Support plate 202 comprises at least one interlock slot 203 (multiple interlock slots 203 depicted in FIG. 2B), and at least one ramp unit 204 comprises an interlock structure 205 (or "interlock tab") protruding into and/or through a corresponding interlock slot 203 of the support plate 202 (multiple interlock structures 205 depicted in FIG. 2B). With this configuration of ramp assembly 200, each interlock structure 205 is configured to move (e.g., slide) along the corresponding interlock slot 203 in response to shrinkage of the corresponding ramp unit 204 upon cooling, such as during cooling associated with the manufacturing process of ramp assembly 200. Hence, with each interlock structure 205 being movable/slidable along and/or within each respective corresponding interlock slot 203, the thermoplastic material of the ramp units 204 is enabled to shrink freely effectively in all directions (with the z-direction and the y-direction being of most concern for internal stress-reduction purposes).

As is best envisioned from FIG. 3, according to an embodiment, at least one ramp unit 204 further comprises a vertical (z-direction) interlock slot 206 near the LUL end, in which part of the support plate 202 is embedded. This unmovable interlock feature embodied in the interlock slot 206 and corresponding portion of support plate 202 acts to inhibit shrinkage of the ramp unit in the interlock slot 203 direction (i.e., y-direction) at the LUL end. Thus, the design dimension(s) at the slope tip of ramp assembly 200 is maintained more accurately and more precisely, e.g., the distance between the interlock slot and the slope tip at LUL end is shorter and prevented from shrinking much, where such dimension and resultant configuration is important for HSA loading/unloading purposes.

Figure 4:
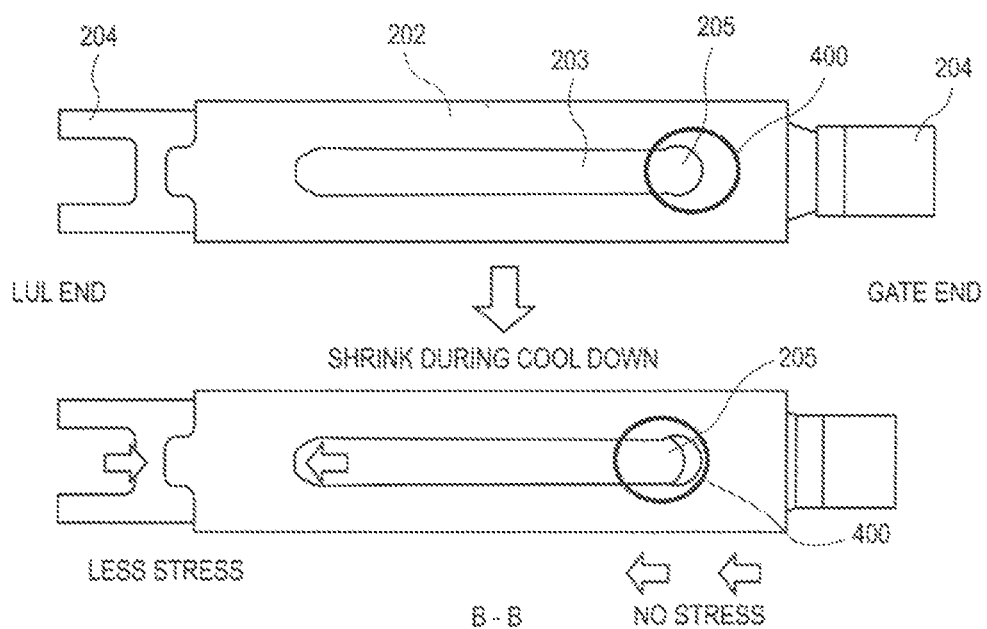
FIG. 4 is a cross-sectional back view illustrating shrinkage of a portion of a ramp assembly, according to an embodiment.

FIG. 4 is a cross-sectional back view illustrating shrinkage of a portion of a ramp assembly, according to an embodiment. FIG. 4 illustrates a cross-section portion of the ramp assembly 200, depicting the support plate 202 and corresponding interlock slot 203, and a single ramp unit 204 and corresponding interlock structure 205 disposed within, through, along the interlock slot 203, with the area 400 highlighting an area of attention for FIG. 4. The top portion of FIG. 4 depicts the portion of the ramp assembly before cool-down of the ramp unit 204 material, and the bottom portion of FIG. 4 depicts the same portion of the ramp assembly after shrinkage of ramp unit 204 in response to cool-down. With this configuration of ramp assembly 200 (FIGS. 2A, 2B), one can envision that the interlock structure 205 moves or slides along the corresponding interlock slot 203 in response to shrinkage of the ramp unit 204 upon cooling, such as during cooling associated with the manufacturing process of ramp assembly 200. The block arrows depict the movement of the thermoplastic material of ramp unit 204 upon cooling and resultant shrinkage, along with a general area of reduced to no stress in the area of the interlock structure 205/interlock slot 203 near the gate end and a general area of less stress in the area of the LUL end. As discussed, with each interlock structure 205 being movable/slidable along and/or within each respective corresponding interlock slot 203, the thermoplastic material of the ramp units 204 is able to shrink more freely in the y-direction than with past designs, thereby reducing or eliminating internal stresses and associated likelihood of cracking.

Dimensional Accuracy at LUL End

Figure 5A:
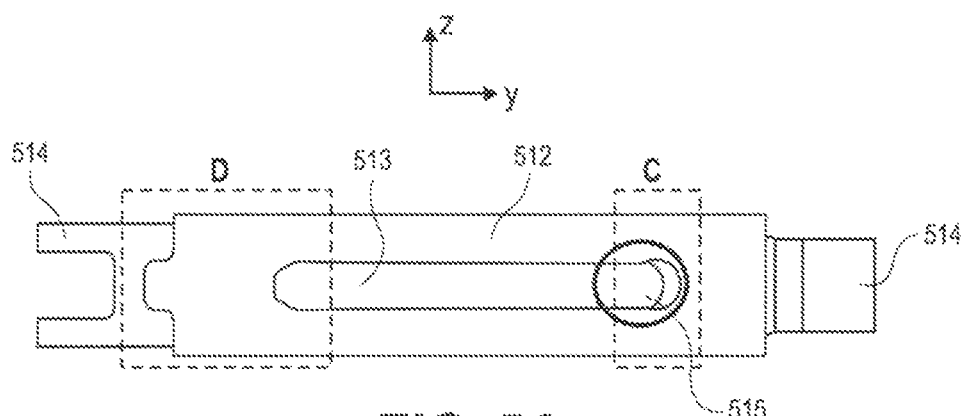
FIG. 5A is a back view illustrating a portion of a ramp assembly, according to an embodiment.
Figure 5B:
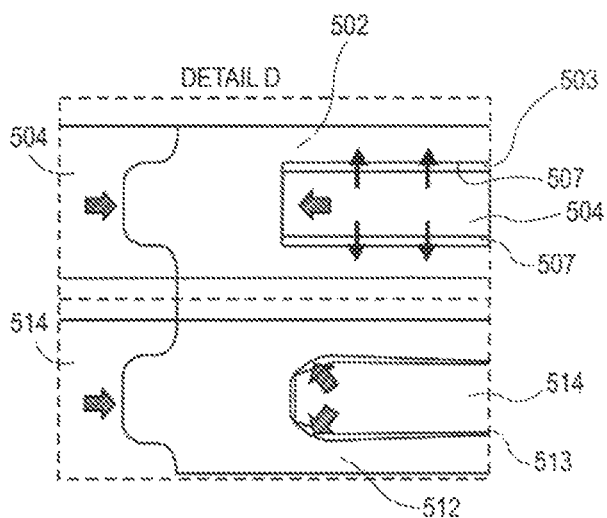
FIG. 5B is a magnified view illustrating a portion of the ramp assembly of FIG. 5A, according to an embodiment.
Figure 5C:
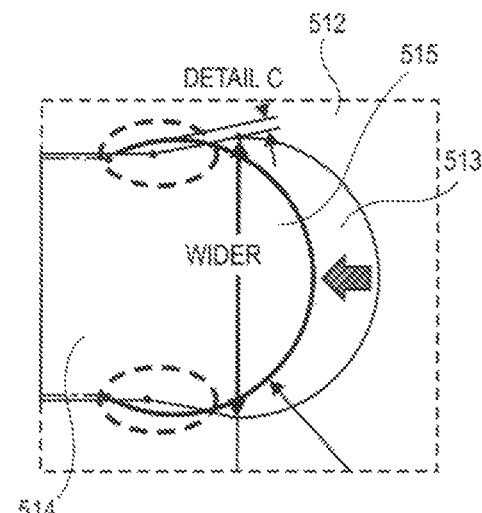
FIG. 5C is a magnified view illustrating a portion of the ramp assembly of FIG. 5A, according to an embodiment.

FIG. 5A is a back view illustrating a portion of a ramp assembly, FIG. 5B is a magnified view illustrating a portion of the ramp assembly of FIG. 5A, and FIG. 5C is a magnified view illustrating a portion of the ramp assembly of FIG. 5A, all according to embodiments. As described in reference to FIG. 3, the unmovable interlock feature embodied in the interlock slot 206 and corresponding portion of support plate 202 acts to inhibit shrinkage of the ramp unit in the y-direction at the LUL end, so that the slope tip of ramp assembly 200 is maintained more accurately. Further features for maintaining dimensional accuracy are as follows.

FIG. 5B depicts two different interlock slot configuration examples, each of which corresponds to the area of a ramp assembly referred to as Detail D (i.e., at/near the LUL end). With reference to the top portion of the ramp assembly of FIG. 5B, a rectangular interlock slot 503 is depicted. With some amount of shrinkage or recession of the ramp unit 504 upon cooling, the shrinkage of the ramp unit 504 may produce a gap 507 between the ramp unit 504 material within the interlock slot 503 of the support plate 502. Because of the gap 507, the ramp unit 504 may have excessive clearance within the interlock slot 503 after cooling, which could allow for undesirable and imprecise repositioning of the ramp unit 504 relative to the support plate 502, such as in the z-direction.

With reference to the bottom portion of the ramp assembly of FIG. 5B, a tapered interlock slot 513 is depicted. With some amount of shrinkage or recession of the ramp unit 514 upon cooling, in contravention of the possibility of the gap 507 and the consequent risk of undesirable repositioning of the ramp unit 504 in the z-direction, according to an embodiment the LUL end of the interlock slot 513 of support plate 512 is tapered at its LUL end, such as depicted in the bottom portion of FIG. 5B. That is, the height of the interlock slot 513 is wider at its LUL end and then tapers down toward the remainder or majority of the interlock slot 513, thereby restraining the z-direction deformation of the ramp unit 514 due to shrinkage. Hence, in contrast with the configuration depicted in the top portion of FIG. 5B, the tapered interlock slot 513 configuration depicted in the bottom portion of FIG. 5B eliminates the likelihood of an undesirable z-direction gap such as gap 507, thereby more accurately maintaining the design dimension upon shrinkage of the ramp unit 514 at the LUL end.

FIG. 5C depicts an interlock structure 515 and corresponding interlock slot 513, corresponding to the area of a ramp assembly referred to as Detail C (i.e., at/near the gate end). With the block arrow generally depicting some amount of shrinkage or recession of the ramp unit 514 in the y-direction upon cooling, the shrinkage of the ramp unit 514 is managed by the interlocking and interaction of an interlock structure 515 within a corresponding interlock slot 513, thereby allowing and enabling the ramp unit 514 to shrink in a controlled manner to maintain critical dimensions and limit induced internal stresses, as described in more detail in reference to FIG. 4 for example. As depicted here, according to an embodiment the interlock slot 513 of the support plate 512 comprises a circular shape at its gate end, which has a larger diameter than the height in the z-direction of the remainder or majority of the interlock slot 513. Thus, upon shrinkage, the interlock structure 515 of the ramp unit 514 moves such that it interferes with the circular shape of the interlock slot 513 of the support plate 512, thereby inhibiting undesirable z-direction deformation of the ramp unit 514 in the area of the gate end, while allowing for managed y-direction deformation and consequent internal stress reduction.

Implementation Alternatives

Figure 6:
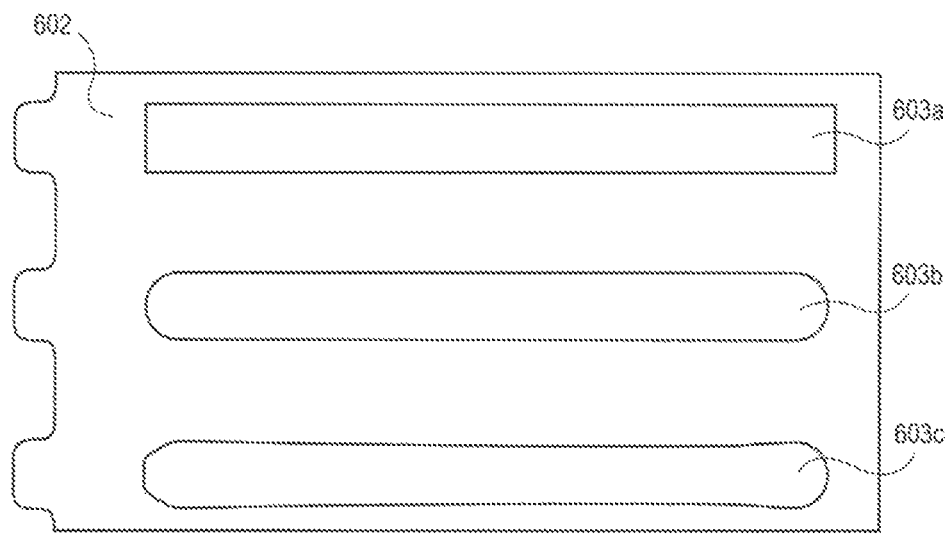
FIG. 6 is a back view illustrating various interlock slots, according to corresponding embodiments.

FIG. 6 is a back view illustrating various interlock slots, according to corresponding embodiments. As the number of and the shape of the interlock slot (e.g., interlock slot 203 of FIGS. 2B, 4 and interlock slot 513 of FIGS. 5A-5C) described herein may vary from implementation to implementation, several example embodiments are illustrated and described as follows. Each of the following examples is depicted in reference to a singular support plate 602, that is, the examples are shown in combination, simply for brevity and convenience.

According to an embodiment, a support/reinforcing plate 602 may be implemented to comprise one or more rectangular interlock slot 603a. However, reference is made back to FIG. 5B in which the possibility of the formation of a z-direction gap (e.g., gap 507) at the LUL end, upon shrinkage of a corresponding ramp body (not shown here) upon cooling, is discussed. According to an embodiment, a support/reinforcing plate 602 may be implemented to comprise one or more interlock slot 603b comprising circular ends at one or both of the slot ends, which may enable ease in manufacturing of such a support plate 602. According to an embodiment, a support/reinforcing plate 602 may be implemented to comprise one or more interlock slot 603c comprising a tapered end at the LUL end (see, e.g., interlock slot 513 of FIG. 5B) and a larger diameter circular end at the gate end (see, e.g., interlock slot 513 of FIG. 5C), which each provides for managing ramp unit shrinkage as described elsewhere herein. Note that each foregoing interlock slot 603a, 603b, 603c configurations may be implemented in various combinations for a given support plate 602, or may implemented singularly.

Figure 7:
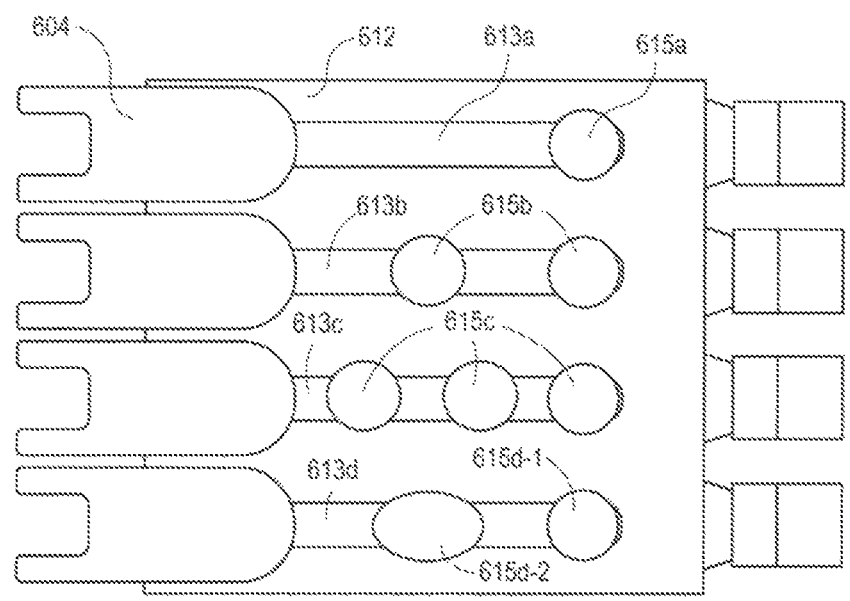
FIG. 7 is a back view illustrating various interlock structures, according to corresponding embodiments.

FIG. 7 is a back view illustrating various interlock structures, according to corresponding embodiments. As the number of and shape of the interlock structure/tab (e.g., interlock structure 205 of FIGS. 2B-4 and interlock structure 515 of FIGS. 5A, 5C) described herein may vary from implementation to implementation, several example embodiments are illustrated and described as follows.

According to an embodiment, a ramp unit/body 604 may be implemented to comprise one interlock structure per interlock slot, such as depicted in reference to interlock structure 615a and interlock slot 613a. According to embodiments, a ramp unit 604 may be implemented to comprise multiple interlock structures per interlock slot, such as depicted in reference to interlock structures 615b/interlock slot 613b and interlock structures 615c/interlock slot 613c. According to an embodiment, a ramp unit 604 may be implemented to comprise multiple interlock structure shapes per interlock slot, such as depicted in reference to interlock structure 615d-1 and interlock structure 615d-2 with interlock slot 613d. Furthermore, different interlock structure shapes, such as interlocks structure 615d-1 and interlocks structure 615d-2, may be implemented to correspond to different interlock slots within a given ramp assembly. Note also that each of the foregoing interlock configurations may be implemented in various combinations, along with various interlock slots or combinations of slots (e.g., interlock slots 603*a*-603*c* of FIG. 6) for a given support plate, or may implemented singularly.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
   a disk media stack comprising a plurality of disk media rotatably mounted on a spindle;
   a head stack assembly (HSA) comprising a plurality of head sliders each comprising a read/write head configured to read from and to write to at least one disk media of the stack;
   a voice coil motor configured to move the HSA for the plurality of head sliders to access portions of a corresponding disk media of the stack; and
   a load/unload ramp assembly configured for loading the HSA to the disk media stack and for unloading the HSA from the disk media stack, the ramp assembly comprising:
      a support plate comprising at least one interlock slot, and
      a plurality of ramp units interconnected with the support plate,
   wherein:
      at least one ramp unit of the plurality of ramp units comprises an interlock structure protruding through a corresponding interlock slot of the support plate, and
      the interlock structure is configured to slide along the corresponding interlock slot in response to shrinkage of the at least one ramp unit upon cooling.

2. The data storage device of claim 1, wherein a plurality of the plurality of ramp units each comprises a respective interlock structure and the support plate further comprises a corresponding plurality of interlock slots.

3. The data storage device of claim 1, wherein:
   the at least one ramp unit further comprises:
      a load/unload end and a gate end; and
      a vertical interlock slot near the load/unload end, in which a portion of the support plate is embedded and which inhibits shrinkage of the at least one ramp unit in the interlock slot direction at the load/unload end.

4. The data storage device of claim 1, wherein:
   the at least one ramp unit further comprises a load/unload end and a gate end along a length of the ramp unit in a y-direction; and
   the interlock slot of the support plate comprises a taper at its load/unload end, thereby maintaining positioning along a height in a z-direction of the ramp unit upon shrinkage of the at least one ramp unit in the area of the load/unload end.

5. The data storage device of claim 1, wherein:
   the at least one ramp unit further comprises a load/unload end and a gate end; and
   the interlock slot of the support plate comprises a circular shape at its gate end which has a larger diameter than a height in a z-direction of a main majority of the interlock slot, such that the interlock structure of the at least one ramp unit interferes with the circular shape upon shrinkage thereby inhibiting deformation of the at least one ramp unit in the z-direction in the area of the gate end.

6. The data storage device of claim 1, wherein:
   the at least one ramp unit further comprises a load/unload end and a gate end;
   the interlock slot of the support plate comprises a taper at its load/unload end, thereby maintaining z-direction positioning upon shrinkage of the at least one ramp unit in the area of the load/unload end; and
   the interlock slot of the support plate comprises a circular shape at its gate end which has a larger diameter than a height in a z-direction of a main majority of the interlock slot, such that the interlock structure of the at least one ramp unit interferes with the circular shape upon shrinkage thereby inhibiting deformation of the at least one ramp unit in the z-direction in the area of the gate end.

7. The data storage device of claim 1, wherein the interlock slot of the support plate is rectangular.

8. The data storage device of claim 1, wherein the interlock slot of the support plate comprises circular ends.

9. A hard disk drive load/unload ramp assembly, the ramp assembly comprising:
   a reinforcing plate comprising at least one interlock slot, and
   a plurality of ramp bodies insert-molded with the reinforcing plate,
   wherein:
      at least one ramp body of the plurality of ramp bodies comprises an interlock tab protruding through a corresponding interlock slot of the reinforcing plate, and
      the interlock tab is configured to move along the corresponding interlock slot in response to shrinkage of the at least one ramp body upon cooling associated with manufacturing of the ramp assembly.

10. The ramp assembly of claim 9, wherein a plurality of the plurality of ramp bodies each comprises a respective interlock tab and the reinforcing plate further comprises a corresponding plurality of interlock slots.

11. The ramp assembly of claim 9, wherein:
   the at least one ramp body further comprises:
      a load/unload end and a gate end; and
      a vertical interlock slot near the load/unload end, in which a portion of the reinforcing plate is embedded and which inhibits shrinkage of the at least one ramp body in the interlock slot direction at the load/unload end.

12. The ramp assembly of claim 9, wherein:
the at least one ramp body further comprises a load/unload end and a gate end along a length of the ramp body in a y-direction; and
the interlock slot of the reinforcing plate comprises a taper at its load/unload end, thereby maintaining positioning along a height in a z-direction of the ramp body upon shrinkage of the at least one ramp body in the area of the load/unload end.

13. The ramp assembly of claim 9, wherein:
the at least one ramp body further comprises a load/unload end and a gate end; and
the interlock slot of the reinforcing plate comprises a circular shape at its gate end which has a larger diameter than a height in a z-direction of a main majority of the interlock slot, such that the interlock tab of the at least one ramp body interferes with the circular shape upon shrinkage thereby inhibiting deformation of the at least one ramp body in the z-direction in the area of the gate end.

14. The ramp assembly of claim 9, wherein:
the at least one ramp body further comprises a load/unload end and a gate end;
the interlock slot of the reinforcing plate comprises a taper at its load/unload end, thereby maintaining z-direction positioning upon shrinkage of the at least one ramp body in the area of the load/unload end; and
the interlock slot of the reinforcing plate comprises a circular shape at its gate end which has a larger diameter than a height in a z-direction of a main majority of the interlock slot, such that the interlock tab of the at least one ramp body interferes with the circular shape upon shrinkage thereby inhibiting deformation of the at least one ramp body in the z-direction in the area of the gate end.

15. The ramp assembly of claim 9, wherein the interlock slot of the reinforcing plate is rectangular.

16. The ramp assembly of claim 9, wherein the interlock slot of the reinforcing plate comprises circular ends.

17. The ramp assembly of claim 9, wherein the plurality of ramp bodies is composed of polyoxymethylene (POM) and the reinforcing plate is composed of stainless steel.

18. A hard disk drive comprising the ramp assembly of claim 9.

19. A hard disk drive comprising:
a disk media stack comprising a plurality of disk media rotatably mounted on a spindle;
a head stack assembly (HSA) comprising a plurality of head sliders each comprising a read/write head configured to read from and to write to at least one disk media of the stack;
a voice coil motor configured to move the HSA for the plurality of head sliders to access portions of a corresponding disk media of the stack; and
ramp means configured for loading the HSA to the disk media stack and for unloading the HSA from the disk media stack, the ramp means comprising:
reinforcing means comprising a first interlocking means; and
load/unload means molded with the reinforcing means;
wherein:
the load/unload means comprises second interlock means structurally mating with the first interlocking means of the reinforcing means, and
the second interlocking means is configured to move along the corresponding first interlocking means in response to shrinkage of the load/unload means upon cooling associated with manufacturing of the ramp means.

* * * * *